(12) United States Patent
Blossey et al.

(10) Patent No.: US 8,758,470 B2
(45) Date of Patent: Jun. 24, 2014

(54) INTAKE AIR FILTER FOR INTERNAL COMBUSTION ENGINES

(75) Inventors: Werner Blossey, Benningen (DE); Mario Rieger, Freiberg (DE); Joachim Schuldt, Ludwigshafen (DE)

(73) Assignee: Mann+Hummel GmbH, Ludwigsburg (DE)

( * ) Notice: Subject to any disclaimer, the term of this patent is extended or adjusted under 35 U.S.C. 154(b) by 422 days.

(21) Appl. No.: 13/130,564

(22) PCT Filed: Nov. 16, 2009

(86) PCT No.: PCT/EP2009/065209
§ 371 (c)(1),
(2), (4) Date: Jun. 28, 2011

(87) PCT Pub. No.: WO2010/057843
PCT Pub. Date: May 27, 2010

(65) Prior Publication Data
US 2011/0247582 A1    Oct. 13, 2011

(30) Foreign Application Priority Data
Nov. 20, 2008  (DE) .................. 20 2008 015 440 U

(51) Int. Cl.
*B01D 46/00* (2006.01)
(52) U.S. Cl.
USPC ............ 55/482; 55/478; 55/486; 55/498; 55/503; 55/510; 123/198 E
(58) Field of Classification Search
USPC .......... 55/478, 486, 487, 498, 503, 510, 482; 123/198 E
See application file for complete search history.

(56) References Cited

U.S. PATENT DOCUMENTS

| | | | | |
|---|---|---|---|---|
| 6,652,614 B2 * | 11/2003 | Gieseke et al. | ................ | 55/498 |
| 6,837,920 B2 * | 1/2005 | Gieseke et al. | ................ | 95/273 |
| 6,986,805 B2 * | 1/2006 | Gieseke et al. | ................ | 95/273 |
| 7,291,198 B2 * | 11/2007 | Gieseke et al. | ................ | 55/498 |
| 7,524,349 B2 * | 4/2009 | Schrage et al. | ................ | 55/502 |

(Continued)

FOREIGN PATENT DOCUMENTS

| | | |
|---|---|---|
| DE | 19712679 A1 | 10/1998 |
| DE | 19930614 A1 | 1/2001 |
| EP | 1201289 A1 | 5/2002 |

OTHER PUBLICATIONS

DPMA search report of DE 20 2008 015 440.5.

*Primary Examiner* — Robert Clemente
(74) *Attorney, Agent, or Firm* — James Hasselbeck

(57) ABSTRACT

The intake air filter according to the invention is for cleaning intake air for internal combustion engines, in particular in vehicles. To this end, the intake air filter comprises an openable housing (10) with an inlet (14) and an outlet (15). Disposed between the inlet (14) and the outlet (15) is an annular, closed main filter element (17) and an annular, closed secondary element (31). The secondary element (31) is connected to the outlet (15), whereby no contamination can pass through to the outlet (15) when the main filter element (17) is replaced. A centering device (29, 30, 40, 41, 42) is provided on the end face opposite the outlet (15) between the secondary element (31) and the main filter element (17), said centering device being used to fix the position of the secondary element (31) within the main filter element (17). This prevents relative movements between the main filter element (17) and the secondary element (31).

10 Claims, 2 Drawing Sheets

(56) References Cited

U.S. PATENT DOCUMENTS

| | | | |
|---|---|---|---|
| 7,537,631 B2 * | 5/2009 | Scott et al. | 55/498 |
| 7,572,310 B2 * | 8/2009 | Gieseke et al. | 55/498 |
| 7,981,186 B2 * | 7/2011 | Schrage et al. | 55/498 |
| 7,981,187 B2 * | 7/2011 | Gieseke et al. | 55/498 |
| 8,038,756 B2 * | 10/2011 | Iddings et al. | 55/502 |
| 8,066,791 B2 * | 11/2011 | Baseotto et al. | 55/503 |
| 8,142,533 B2 * | 3/2012 | Gillenberg et al. | 55/337 |
| 8,163,056 B2 * | 4/2012 | Coulonvaux et al. | 55/498 |
| 8,394,166 B2 * | 3/2013 | Scott et al. | 55/497 |
| 8,414,675 B2 * | 4/2013 | Iddings et al. | 55/502 |
| 8,444,735 B2 * | 5/2013 | Coulonvaux et al. | 55/498 |
| 8,480,778 B2 * | 7/2013 | Baseotto et al. | 55/498 |
| 2006/0086075 A1 * | 4/2006 | Scott et al. | 55/498 |
| 2006/0254229 A1 | 11/2006 | Schrage et al. | |
| 2008/0190082 A1 * | 8/2008 | Scott et al. | 55/520 |
| 2009/0217632 A1 * | 9/2009 | Coulonvaux et al. | 55/359 |
| 2009/0249756 A1 * | 10/2009 | Schrage et al. | 55/498 |
| 2010/0146920 A1 * | 6/2010 | Iddings et al. | 55/502 |
| 2012/0210683 A1 * | 8/2012 | Gillenberg et al. | 55/337 |
| 2013/0199138 A1 * | 8/2013 | Scott et al. | 55/478 |

* cited by examiner ial patent application no. PCT/EP2009/065209, filed Nov.
INTAKE AIR FILTER FOR INTERNAL COMBUSTION ENGINES

CROSS REFERENCE TO RELATED APPLICATIONS

This application is US National Stage Entry of international patent application no. PCT/EP2009/065209, filed Nov. 16, 2009 designating the United States of America, the entire disclosure of which is incorporated herein by reference. Priority is claimed based on Federal Republic of Germany patent application no. 20 2008 015 440.5, filed Nov. 20, 2008.

TECHNICAL FIELD

The present invention concerns an intake air filter for internal combustion engines.

PRIOR ART

EP 1 201 289 discloses an intake air filter that comprises a two-part housing with a main filter element and a secondary filter element. An inlet for air to be purified and an outlet for purified air are arranged on the housing. The secondary filter element is connected at one end face to the outlet in such a way that, when exchanging the main filter element or when the main filter element is missing, no contaminants can reach the outlet. On the other end face the secondary element is supported in axial direction on the main filter element. In this connection, radial relative movements between the main filter element and the secondary filter element may occur. By means of these relative movements the attachment on the outlet may become loosened or the filter elements may be damaged.

It is an object of the invention to prevent relative movements between the main filter element and the secondary element.

This object is solved by the features of claim 1.

SUMMARY OF THE INVENTION

The intake air filter according to the present invention serves for purifying air for internal combustion engines. Such intake air filters can be used in connection with stationary or mobile machines, in particular in vehicles. The intake air filter comprises a housing that can be opened and has an inlet for air to be purified and an outlet through which the purified air can flow out of the intake air filter and pass into the internal combustion engine. In advantageous embodiments the housing is of a three-part or multi-part configuration in order to be able to realize simple shapes. These parts can then be produced in a simple way, for example, by a plastic injection molding method. The individual parts of the housing can be connected to each other in a detachable or non-detachable way wherein at least one part is detachably connected to the other parts in order to be able to perform a filter element exchange. Advantageous kinds of connections of the parts are, for example, screw connections, clip-on connections, weld connections or adhesive connections that can be produced in a simple and inexpensive way.

Between the inlet and the outlet a main filter element of an annular closed shape is arranged that can have any cross-sectional shape, for example, can be of a circular ring shape or can be oval. Moreover, the main filter element may be cylindrical or conical. The main filter element comprises a filter medium that is suitable for purifying air. Such filter media can be, for example, filter papers with cellulose, non-woven filters of synthetic fibers or other suitable materials, wherein the filter media are embodied of a single layer or multi-layer configuration, folded or wound. The main filter element has arranged downstream thereof in the flow direction a secondary element wherein the secondary element is connected seal-tightly to the outlet. For this purpose, the secondary element can be screwed to, clamped or snapped on the outlet. On the end face of the secondary element that is opposite the outlet a centering device is provided that, in radial direction, secures the position of the secondary element within the main element in that it prevents radial movements. For this purpose, the centering device can be, for example, embodied by noses on the outer circumference of the secondary element that in radial direction project outwardly and correspond with an appropriate counter contour on the inner circumference of the main filter element. Moreover, the centering device in another embodiment can also be arranged centrally in the area of a component center axis.

Due to manufacturing tolerances or thermal expansions in axial direction length differences of the secondary elements and main filter elements may result. For avoiding undesirable tensions in the longitudinal direction, the centering device is provided in axial direction with a length compensation. Accordingly, on the one hand, radial movements that can cause uncontrolled detachment of the secondary element are prevented and, on the other hand, axial movements that can lead to tensions and impairment of the filter elements are allowed.

According to an advantageous embodiment of the intake air filter according to the present invention, the main filter element comprises on the end face that is opposite the outlet a fluid-tight bottom that, for example, may be formed by polyurethane foam. Moreover, the bottom can be comprised of a shape-stable material, for example, sheet metal or a plastic disk, and can be connected by means of an adhesive seal-tightly to the filter medium. Accordingly, additional sealing means for separating the inlet from the outlet are not needed. On the bottom the centering device is arranged. In this connection, a part of the centering device can be integrally formed on the bottom or can be connected detachably or non-detachably as a separate component with the bottom. Detachable connections can be generated, for example, by slipping on, clipping on or by screws. Non-detachable connections between the bottom and the centering device can be formed, for example, by adhesives or by fusing. The arrangement of the centering device on the bottom provides that the secondary element has two bearing locations spaced-apart from each other that optimally support the secondary element and thus prevent undesirable movements. Moreover, complex contours for supporting the secondary element in the housing are not required.

In a further embodiment of the invention, the secondary element has, on its end face that is opposite the outlet, a fluid-tight cover on which a part of the centering device is arranged. This cover can be designed in accordance with the afore described bottom of the main filter element. By the arrangement of the centering device on the cover, neighboring components correspond with each other and enable simple geometries within the housing.

It is advantageous that the main filter element comprises a support pipe of a shape-stable material, in particular, a thermoplastic synthetic material. The support pipe has a plurality of air passages and generates therefore no noteworthy pressure loss for the air flowing through. Since the support pipe is arranged on the outlet side of the filter medium, it is prevented that the filter medium is deformed by the air passing through. The fluid-tight bottom is advantageously formed integrally on the support pipe so that the afore described function of the bottom is integrated into the support pipe required for filter medium support. As a result of the functional integration the number of components can be reduced. Also, additional connections between bottom, filter medium and support pipe are not needed.

A further embodiment of the invention provides that the secondary element has a support body which has the cover formed integrally thereon. The embodiments with regard to the support pipe of the main filter element apply in the same way also to the support body of the secondary element.

According to an advantageous embodiment of the invention, the centering device comprises a receiving device that is formed as a receiving crown with webs arranged in distributed fashion. The webs of the receiving crown will slightly move apart elastically when mounting the opposite member and enable in this way a play-free support of the counter member in the receiving crown.

In an alternative embodiment of the invention the centering device comprises an annularly shaped receiving wall as a receiving device. This receiving wall is embodied as a rigid element. The corresponding counter member can be inserted into the receiving wall and be surrounded by it circumferentially or can be pushed onto the receiving wall and surround the receiving wall.

According to another advantageous embodiment, the centering device has an insertion device embodied as a pin which forms the counter member of the receiving device. In this connection, the pin can be embodied as a rigid element and can be inserted into the above described receiving crown. In other embodiments, the pin can also be comprised of elastic material and can be embodied as a compressible element. In this way, a play-free support of the secondary element in the filter element is enabled.

In a special embodiment on a rigid pin an elastic or compressible ring is arranged. This ring enables a simple installation because it is compressed upon insertion of the pin into the receptacle. In this way, tolerances between the components can be compensated without play being generated.

BRIEF DESCRIPTION OF THE DRAWINGS

The invention will be explained in the following with the aid of embodiments in more detail. It is shown in.

EMBODIMENT(S) OF THE INVENTION

Figure 1:
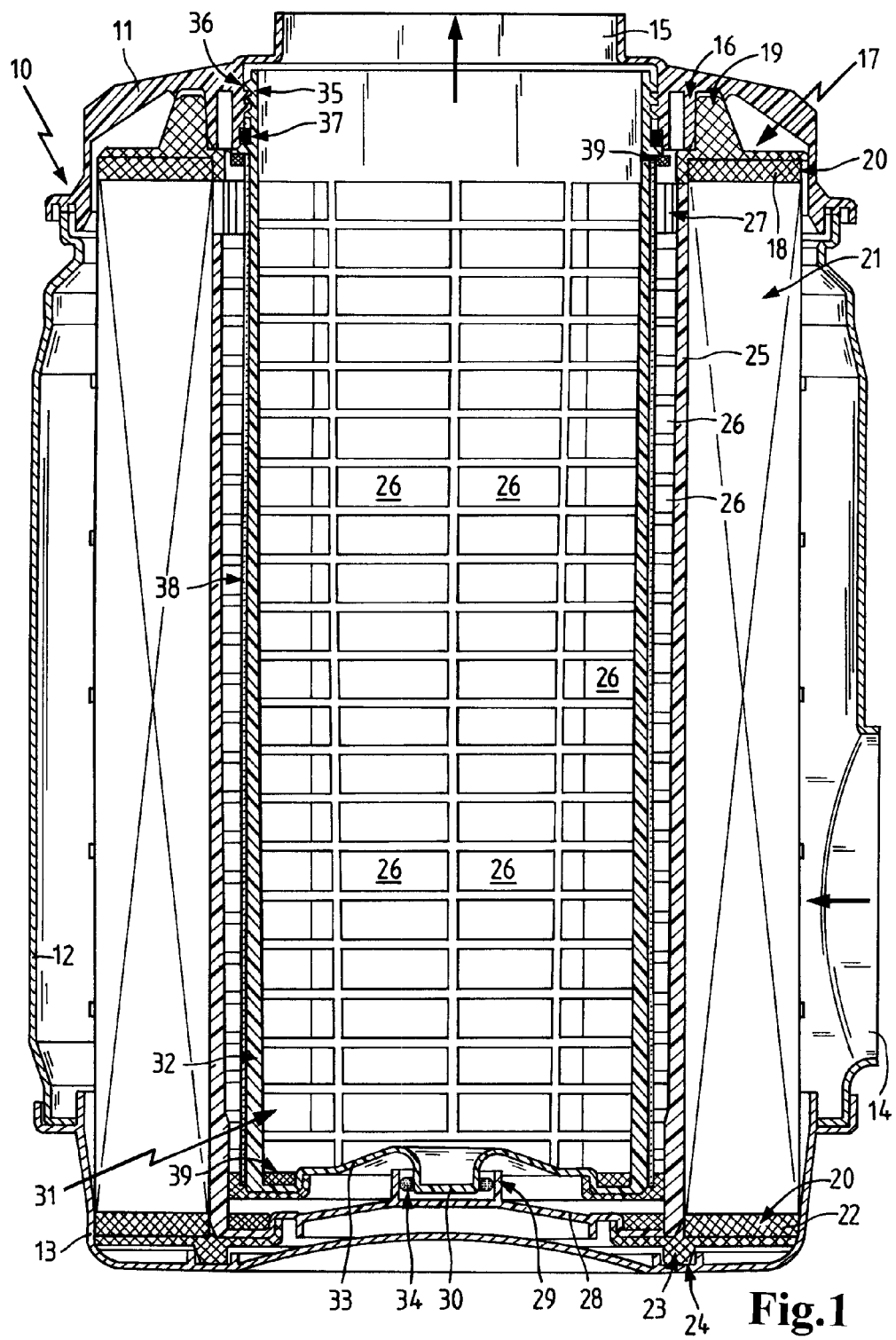
FIG. 1 an intake air filter in section.

In FIG. 1, an intake air filter is illustrated in section. The intake air filter comprises a housing 10 that can be opened and is comprised of a thermoplastic synthetic material. In this embodiment the housing 10 is comprised of a cover 11, a central part 12, and a cup 13. As a result of the multi-part configuration of the housing 11, the individual parts 11, 12, 13 have a simpler geometry and can therefore be produced in a more simple and less expensive way. The cover 11 is fused fixedly with the central part 12 thus forming a constructive unit. The cup 13 is detachably connected to the central part 12 wherein for attachment of the parts 12, 13 to each other, for example, clamp clips (not illustrated) or the like can be used. The central part 12 has an inlet 14 through which air to be purified flows into the housing 10. The cover 11 comprises an outlet 15 that is integrally formed on the cover 11 so as to project in a socket shape outwardly. The inner contour of the cover 11 has a cylindrically extending sealing collar 16 onto which a main filter element 17 with a first end disk 18 arranged at its end face is seal-tightly pushed. The end disk 18 is comprised of a compressible polyurethane foam that forms a sealing bead 19 and a disk area 20. The sealing bead 19 corresponds in radial direction seal-tightly with the sealing collar 16. In axial direction the sealing bead 19 contacts the end face of the cover 11. Into the disk area 20 a folded filter medium 21 of annularly closed shape projects and, at the end face, is seal-tightly embedded by foaming in the disk area 20. On the opposite end face of the filter medium 21 a second end disk 22 of polyurethane foam is arranged that also has a disk area 20 as described above. On the disk area 20 a support bead 23 is integrally formed that may be embodied in a circumferentially extending ring shape or divided into several partial segments. The support bead 23 is compressed axially within the housing 10 so that axial play of the main filter element 17 in the housing 10 is prevented. This support bead 23, when the cup 13 is closed, projects into an annular receptacle 24 and reduces in this way vibrations of the filter element 17 in the housing 10. In the interior of the filter medium 21 a support pipe 25 is arranged which has a plurality of window-shaped passages 26. The support pipe 25 has at its first end face a slotted end area 27 that is surrounded at the end face by the disk area 20. Therefore, the main filter element 17 is provided with a satisfactory radial elasticity in order to be pushed onto the sealing collar 16. On the opposite end face the support pipe 25 has a closed slightly inwardly curved bottom 28. On the inwardly projecting side of the bottom 28 a cup-shaped receiving wall 29 is arranged. Into this receiving wall 29 a pin 30 of a secondary element 31 that is arranged within the main filter element 17 projects. This secondary element 31 has a support body 32 that, like the support pipe 25 of the main filter element 17, has a plurality of rectangular passages 26. The support body 32 has also a fluid-tight cover 33 on which the pin 30 is integrally formed. On the pin 30 there is a compressible ring 34 arranged that serves for vibration reduction between the secondary element 31 and the main filter element 17. Moreover, mounting of the centering device, formed by the pin 30 and the receiving wall 29, is facilitated by the ring 34. The height of the receiving wall 29 and the length of the pin 30 are selected such that the main filter element 17 contacts the sealing collar 16 before the pin 30 contacts the receiving wall 29. Only when the filter element 17 is being inserted farther, the pin 30 contacts the receiving wall 29. In order to facilitate mounting, either the pin 30 or the receiving wall 29 can have an insertion ramp (not illustrated). Mounting of the main filter element 17 is facilitated in this way.

On the end face of the support body 32 opposite the pin 30 a fastening thread 35 is arranged that is screwed into an appropriate counter thread 36 on the housing. As a seal between this secondary element 31 and the cover 11, an O-ring 37 is provided that is supported on a surface of the counter thread 36. The secondary element 31 comprises furthermore a non-woven filter 38 that covers the area of the passages 26 and in the area of the end faces is attached by means of an adhesive 39 on the support body 32. As an alternative to the adhesive connection, the non-woven filter 38 can also be fused seal-tightly with the support body 32 or can be embedded by foaming, for example, with PUR foam. Moreover, the fastening means of the non-woven filter 38 on the two end faces may be different. In this connection, any combination of fastening means of the different end faces are possible so that the non-woven filter 38 can be fused, for example, to one end face and can be glued, for example, to the other end face.

For purifying the intake air of the internal combustion engine the unfiltered air flows in the direction of the arrow into the inlet 14 and is distributed about the main filter element 17. Because of the pressure conditions that exist in the intake air filter, the air passes through the filter medium 21 and the particles contained in the air are deposited on the filter medium. The purified air flows through the passages 26 to the secondary element 31. In the purified air there are no further particles to be separated so that the air passes through the non-woven filter 38 and the support body 32. From the inner volume of the secondary element 31 the air flows in direction of the arrow through the outlet 15 out of the intake air filter in the direction toward the internal combustion engine.

When exchanging the main filter element 17, first the cup 13 is separated from the central part 12. The main filter element 17 can subsequently be pulled off by hand wherein the pin 30 is pulled out of the receiving wall 29 and the sealing bead 19 is removed from the sealing collar 16. The secondary element 31 remains screwed onto the cover 11 so that no contaminants can reach the outlet 15. Upon insertion of a new main filter element 17, the sealing bead 19 is pushed partially onto the sealing collar 16 before the pin 30 is immersed in the receiving wall 29. After the main filter element 17 has been completely pushed onto the sealing collar 16 and the pin 30 is centered in the receiving wall 29, the cup 13 can be connected again to the central part 12.

Figure 2:
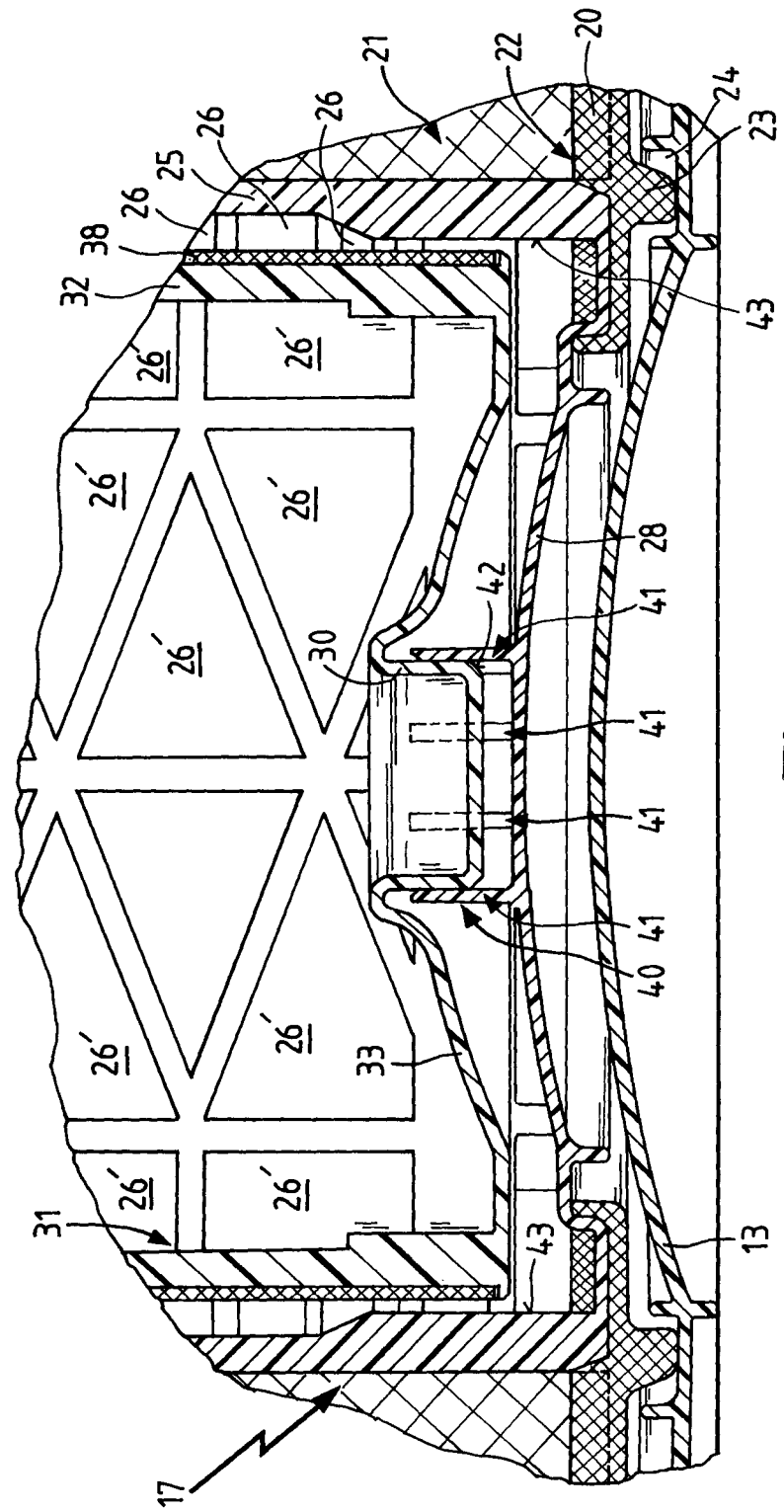
FIG. 2 a detail of the intake air filter in an alternative embodiment.

In FIG. 2, a detail of the intake air filter in an alternative embodiment is illustrated. Same components are identified with same reference characters. In contrast to FIG. 1, the support body 32 has substantially triangular passages 26'. Moreover, on the pin 30 of the support body no additional ring 34 is arranged. Moreover, the non-woven filter 38 is fused without additional components to the support body 32. The main filter element 17 comprises on its bottom 28 a receiving crown 40 that is comprised of individual webs 41. These webs 41 move elastically apart when subjected to a defined pressure and enable in this way the reception of the pin 30. When doing so, the hard synthetic material of the pin 30 glides along the webs 41 that are comprised also of a shape-stable synthetic material. To facilitate mounting, the pin 30 has an insertion ramp 42 that, for example, is embodied as a bevel or a rounded portion. The support pipe 25 of the main filter element 17 has at the area near the end face guiding ribs 43 that effect a rough centering action of the secondary element 31 in the main filter element 17 and therefore facilitate installation. The pin 30 has in axial directions sufficient play in the receiving crown 40 so that a length compensation is achieved and therefore length tolerances or thermal expansions will not damage the filter elements 17, 31.

Of course, the individual partial aspects of the different embodiments can be combined in a suitable way with each other. Moreover, a reversal of the geometric arrangement of pin and receptacle is conceivable.

The invention claimed is:

1. An Intake air filter filtering air flow into an internal combustion engine, comprising:
    a housing enclosing a chamber therein, said housing openable to access said chamber, said housing including
        an airflow inlet; and
        an airflow outlet;
    a main filter element arranged with said chamber, said filter element seal-tightly arranged between the inlet and the outlet such that airflow flowing from said inlet to said outlet is required to flow through said main filter element,
    wherein said main filter element has an annularly closed shape,
    a secondary element having an annularly closed shape, said secondary element arranged downstream of said main filter element in flow direction and connected seal-tightly with the outlet such that airflow from said chamber in said outlet is required to flow through said secondary element;
    a centering device arranged at an end face of said main filter element, said end face on an axial end of said main filter element opposite said airflow outlet,
    wherein said centering device is operable to fix radial position of said secondary element within said main filter element,
    wherein said centering device is provided between said secondary element and said main filter element,
    wherein said centering device comprises an insertion device that is embodied as a pin;
    wherein a compressible ring is arranged on said pin.

2. The Intake air filter according to claim 1, wherein the main filter element on an axial end face opposite the airflow outlet comprises a fluid-tight bottom closing off an open interior of said main filter element at said main filter element axial end face,
    wherein a part of said centering device is arranged on said fluid-tight bottom.

3. The Intake air filter according to claim 1, wherein an axial end face of said secondary element positioned opposite said airflow outlet comprises
    a fluid-tight cover closing off an open interior of said secondary element at said secondary element axial end face;
    wherein a part of said centering device is arranged on said fluid-tight cover.

4. The Intake air filter according to claim 2, wherein said main filter element comprises
    a support pipe having a plurality of airflow passages extending through a wall of said support pipe,
    wherein said fluid-tight bottom is integrally formed and unitary with said support pipe.

5. The Intake air filter according to claim 3, wherein said secondary element comprises
    a support body on which said fluid-tight cover is integrally formed and unitary with.

6. The Intake air filter according to claim 1, wherein said centering device comprises
    a receiving device which is formed as a receiving crown with webs arranged in a distributed fashion.

7. The Intake air filter according to claim 1, wherein said centering device includes a receiving device which is formed as an annular receiving wall.

8. The Intake air filter according to claim 1, wherein said centering device in axial direction has a length compensation.

9. The Intake air filter according to claim 2, wherein an axial end face of said secondary element positioned opposite said airflow outlet comprises
    a fluid-tight cover closing off an open interior of said secondary element at said secondary element axial end face,
    wherein a part of said centering device is arranged on said fluid-tight cover;
    wherein said main filter element comprises
    a support pipe having a plurality of airflow passages extending through a wall of said support pipe;
    wherein said fluid-tight bottom is integrally formed and unitary with said support pipe,
    wherein said centering device includes an annularly arranged receiving device arranged on said fluid tight bottom, wherein said centering device comprises an insertion device that is embodied as a pin, said pin integrally formed on said fluid-tight cover, said pin having a portion received within said receiving device.

10. An Intake air filter filtering air flow into an internal combustion engine, comprising:
- a housing enclosing a chamber therein, said housing openable to access said chamber, said housing including
  - an airflow inlet; and
  - an airflow outlet;
- a main filter element arranged with said chamber, said filter element seal-tightly arranged between the inlet and the outlet such that airflow flowing from said inlet to said outlet is required to flow through said main filter element,
- wherein said main filter element has an annularly closed shape,
- a secondary element having an annularly closed shape, said secondary element arranged downstream of said main filter element in flow direction and connected seal-tightly with the outlet such that airflow from said chamber in said outlet is required to flow through said secondary element;
- a centering device arranged at an end face of said main filter element, said end face on an axial end of said main filter element opposite said airflow outlet,
- wherein said centering device is operable to fix radial position of said secondary element within said main filter element,
- wherein said centering device is provided between said secondary element and said main filter element,
- wherein the main filter element on an axial end face opposite the airflow outlet comprises a fluid-tight bottom closing off an open interior of said main filter element at said main filter element axial end face,
- wherein a part of said centering device is arranged on said fluid-tight bottom,
- wherein an axial end face of said secondary element positioned opposite said airflow outlet comprises
  - a fluid-tight cover closing off an open interior of said secondary element at said secondary element axial end face,
  - wherein a part of said centering device is arranged on said fluid-tight cover:
- wherein said main filter element comprises
  - a support pipe having a plurality of airflow passages extending through a wall of said support pipe;
- wherein said fluid-tight bottom is integrally formed and unitary with said support pipe,
- wherein said centering device includes an annularly arranged receiving device arranged on said fluid tight bottom,
- wherein said centering device comprises an insertion device that is embodied as a pin, said in integrally formed on said fluid-tight cover, said in having a portion received within said receiving device,
- wherein a compressible ring is arranged on said pin between said pin and said receiving device, said compressible ring abutting against said pin and said receiving device.

* * * * *